(12) United States Patent
Yamaguchi

(10) Patent No.: US 11,246,188 B2
(45) Date of Patent: Feb. 8, 2022

(54) WIRELESS COMMUNICATION APPARATUS AND NON-TRANSITORY COMPUTER-READABLE RECORDING MEDIUM

(71) Applicant: JVCKENWOOD Corporation, Yokohama (JP)

(72) Inventor: Tomohiro Yamaguchi, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 53 days.

(21) Appl. No.: 16/798,462

(22) Filed: Feb. 24, 2020

(65) Prior Publication Data

US 2020/0296798 A1 Sep. 17, 2020

(30) Foreign Application Priority Data

Mar. 13, 2019 (JP) ............................. JP2019-046100

(51) Int. Cl.
*H04W 88/08* (2009.01)
*H04L 27/144* (2006.01)
*H04L 27/156* (2006.01)
*H04W 72/04* (2009.01)

(52) U.S. Cl.
CPC ........... *H04W 88/08* (2013.01); *H04L 27/144* (2013.01); *H04L 27/156* (2013.01); *H04W 72/0446* (2013.01)

(58) Field of Classification Search
CPC . H04W 88/08; H04W 72/0446; H04W 88/02; H04L 27/144; H04L 27/156; H04L 27/12; H04B 1/50
See application file for complete search history.

(56) References Cited

U.S. PATENT DOCUMENTS

| 2007/0009022 | A1* | 1/2007 | Chen | ................... | H04B 1/40 375/229 |
| 2007/0025471 | A1* | 2/2007 | Chen | ................... | H04W 52/028 375/316 |
| 2016/0020891 | A1* | 1/2016 | Jung | ................... | H04W 72/1278 370/280 |
| 2019/0289601 | A1* | 9/2019 | Sugaya | ................ | H04W 72/0446 |
| 2019/0357257 | A1* | 11/2019 | Adachi | ................ | H04W 4/80 |

FOREIGN PATENT DOCUMENTS

JP 2002-354516 12/2002

\* cited by examiner

*Primary Examiner* — Dady Chery
(74) *Attorney, Agent, or Firm* — Amin, Turocy & Watson, LLP

(57) ABSTRACT

A wireless communication apparatus performs communication for which a receiving timing and a transmitting timing are defined by using time slots. The wireless communication apparatus includes a control circuitry configured to control the wireless communication apparatus. The control circuitry includes a decoding circuitry configured to start a decoding process, on data received in a first time slot, immediately after a start of a second time slot subsequent to the first time slot. When a result of the decoding process is information requesting the wireless communication apparatus to perform transmission, the control circuitry is configured to perform a transmission preparation process from an end of the decoding process to a start of a third time slot subsequent to the second time slot, within a period of the second time slot for enabling the wireless communication apparatus to perform transmission.

5 Claims, 5 Drawing Sheets

WIRELESS COMMUNICATION APPARATUS AND NON-TRANSITORY COMPUTER-READABLE RECORDING MEDIUM

CROSS-REFERENCE TO RELATED APPLICATION

This application claims priority from Japanese Application No. 2019-046100, filed on Mar. 13, 2019, the contents of which are incorporated by reference herein in its entirety.

BACKGROUND

The present disclosure relates to a wireless communication apparatus and a non-transitory computer-readable recording program.

For battery-driven portable digital wireless communication apparatuses, the operation clock of a central processing unit (CPU) is sometimes reduced as low as possible in order to increase the operating time. In the case where the digital wireless communication apparatus receives certain data and then transits to data transmission, it takes time to finish the Forward Error Correction (FEC) decoding of the received data, and the transition to the data transmission is delayed more as the operation clock of the CPU is lower. Therefore, there is a disclosed technology that allows a reduction in the time of a decoding process.

For example, JP-A-2002-354516 discloses the technology in which, in order to reduce the time of a decoding process, the clock frequency of the CPU is set to 51.2 kHz during receiving data, and it is changed to 1 MHz during processing the data.

According to JP-A-2002-354516, however, the operation clock frequency of the CPU is changed depending on whether a decoding process is being executed. Therefore, in JP-A-2002-354516, there is an increase in the power consumption of the CPU.

SUMMARY

A wireless communication apparatus according to an embodiment performs communication for which a receiving timing and a transmitting timing are defined by using time slots. The wireless communication apparatus includes a control circuitry configured to control the wireless communication apparatus. The control circuitry includes a decoding circuitry configured to start a decoding process, on data received in a first time slot, immediately after a start of a second time slot subsequent to the first time slot. When a result of the decoding process is information requesting the wireless communication apparatus to perform transmission, the control circuitry is configured to perform a transmission preparation process from an end of the decoding process to a start of a third time slot subsequent to the second time slot, within a period of the second time slot for enabling the wireless communication apparatus to perform transmission.

A non-transitory computer-readable recording medium according to an embodiment contains a computer program for a computer operating as a wireless communication apparatus that performs communication for which a receiving timing and a transmitting timing are defined by using time slots. The program causes the computer to execute: starting a decoding process, on data received in a first time slot, immediately after a start of a second time slot subsequent to the first slot; determining whether a result of the decoding process is information requesting the wireless communication apparatus to perform transmission; and performing, when the result of the decoding process is information requesting the wireless communication apparatus to perform transmission, a transmission preparation process from an end of the decoding process to a start of a third time slot subsequent to the second slot, within a period of the second time slot for enabling the wireless communication apparatus to perform transmission.

DETAILED DESCRIPTION

With reference to the accompanying drawings, an embodiment according to the present invention is described below in detail. The present invention is not limited to the embodiment. If there are multiple embodiments, the embodiments may be combined.

Embodiment

Figure 1:
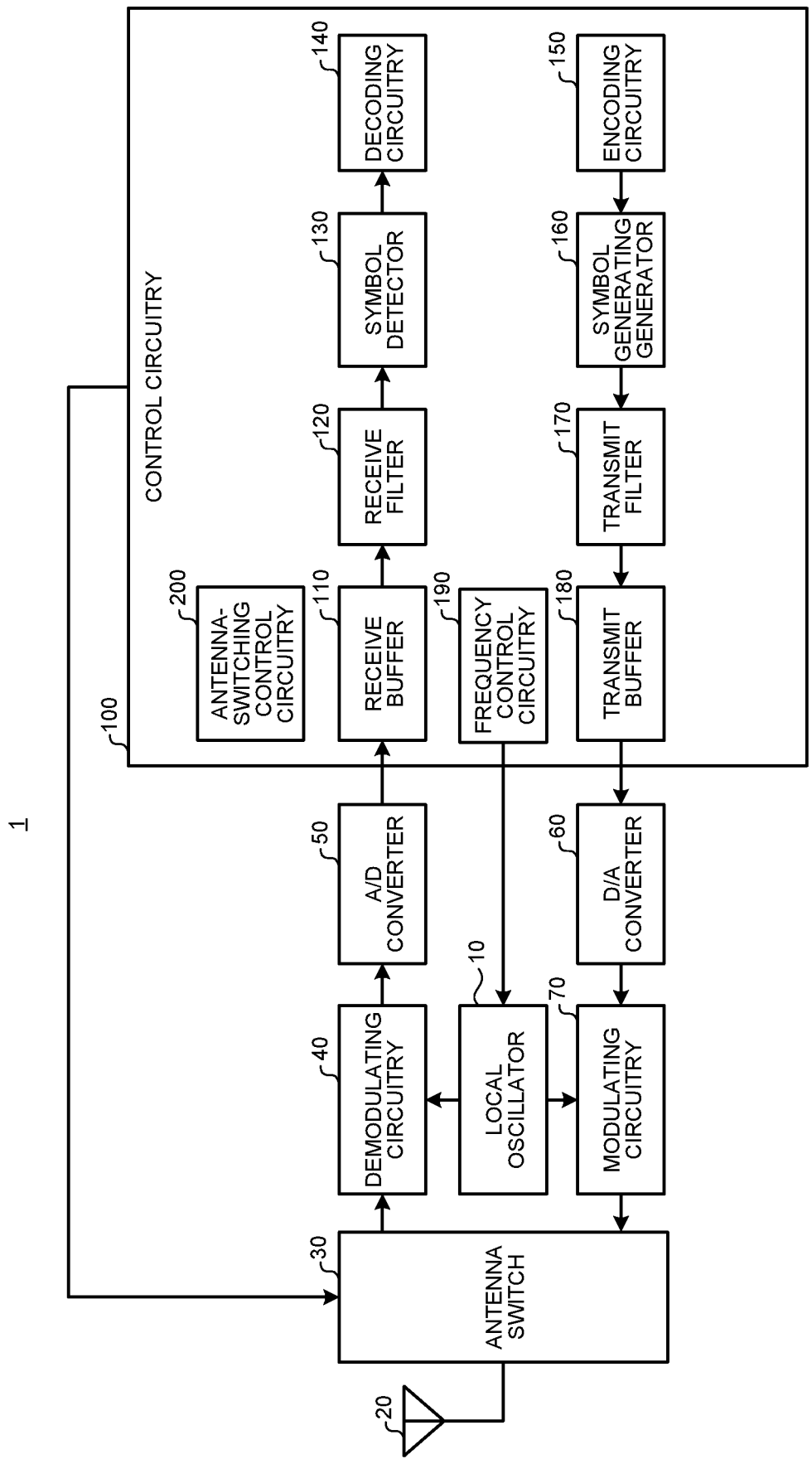
FIG. 1 is a block diagram that illustrates an example of the configuration of a wireless communication apparatus according to an embodiment of the present invention.

With reference to FIG. 1, a configuration of a wireless communication apparatus 1 according to an embodiment of the present invention is described. FIG. 1 is a block diagram that illustrates an example of the configuration of the wireless communication apparatus 1.

The wireless communication apparatus 1 includes a local oscillator 10, an antenna 20, an antenna switch 30, a demodulating circuitry 40, an analog to digital (A/D) converter 50, a digital to analog (D/A) converter 60, a modulating circuitry 70, and a control circuitry 100. The wireless communication apparatus 1 according to the present embodiment is a wireless communication apparatus that performs digital wireless communications.

The local oscillator 10 changes the frequency of a signal. The local oscillator 10 changes the reception frequency of a signal to be received by the demodulating circuitry 40 in accordance with, for example, the phase locked loop (PLL) control from the control circuitry 100. The local oscillator 10 changes the transmission frequency of a signal to be transmitted by the modulating circuitry 70 in accordance with, for example, the control from the control circuitry 100.

The antenna 20 transmits and receives radio frequency (RF) signals. The antenna 20 is connected to the antenna switch 30.

The antenna switch 30 is connected to the antenna 20, the demodulating circuitry 40, and the modulating circuitry 70. The antenna switch 30 connects the antenna 20 and the demodulating circuitry 40 in accordance with, for example, the control from the control circuitry 100. The antenna switch 30 executes switching connection between the antenna 20 and the modulating circuitry 70 in accordance with, for example, the control from the control circuitry 100.

The demodulating circuitry 40 receives an RF signal that is received by the antenna 20. The demodulating circuitry 40 demodulates the received RF signal. The demodulating circuitry 40 outputs the demodulated signal (demodulation signal) to the A/D converter 50.

The A/D converter 50 converts the demodulation signal (analog signal) input from the demodulating circuitry 40 into a digital signal. The A/D converter 50 outputs the digital demodulation signal to a receive buffer 110 in the control circuitry 100.

The D/A converter 60 receives a modulation signal (digital signal) from a transmit buffer 180 in the control circuitry 100. The D/A converter 60 converts the received modulation signal into an analog signal. The D/A converter 60 outputs the analog modulation signal to the modulating circuitry 70.

The modulating circuitry 70 executes modulation in accordance with the modulation signal that is received from the D/A converter 60. The modulating circuitry 70 outputs the modulated RF signal to the antenna 20. Thus, the antenna 20 transmits the RF signal to the outside.

The control circuitry 100 controls each part of the wireless communication apparatus 1. The control circuitry 100 includes, for example, a CPU, a random access memory (RAM), and a read only memory (ROM). In this case, the ROM stores therein a program for the CPU to control each part. The CPU loads a program stored in the ROM and executes the program in the data area allocated in the RAM so as to control each part of the wireless communication apparatus 1. The control circuitry 100 includes the receive buffer 110, a receive filter 120, a symbol detector 130, a decoding circuitry 140, an encoding circuitry 150, a symbol generator 160, a transmit filter 170, the transmit buffer 180, a frequency control circuitry 190, and an antenna-switching control circuitry 200.

The program can be stored and provided to a computer using any type of non-transitory computer readable recording media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The receive buffer 110 temporarily stores data of a demodulation signal that is input from the A/D converter 50. When a predetermined volume of data is stored, the receive buffer 110 outputs the data to the receive filter 120.

The receive filter 120 is a roll-off filter that detects a symbol point of a demodulation signal and that executes waveform shaping. The receive filter 120 executes waveform shaping (filtering) on a demodulation signal input from the receive buffer 110 and outputs it to the symbol detector 130.

The symbol detector 130 detects a symbol from the signal input from the receive filter 120, determines the symbol value of the detected symbol, and generates reception symbol data. The symbol detector 130 outputs the reception symbol data to the decoding circuitry 140.

The decoding circuitry 140 executes a decoding process (FEC decoding process) based on the reception symbol data input from the symbol detector 130.

The control circuitry 100 controls various types of processing on the wireless communication apparatus 1 in accordance with a result of the decoding process of the decoding circuitry 140. For example, in a case where a received signal is a sound signal, the control is performed to output the sound from an undepicted sound output unit. In a case where a received signal is text data, the control is performed to display the text on an undepicted display. Furthermore, in a case where a received signal is a control signal for controlling the wireless communication apparatus 1, the control circuitry 100 controls processing based on the details of the control signal.

The encoding circuitry 150 performs an encoding process (FEC encoding process) on data to be transmitted to the outside by the wireless communication apparatus 1. The encoding circuitry 150 outputs transmission data having been subjected to an encoding process to the symbol generator 160.

The symbol generator 160 converts the transmission data input from the encoding circuitry 150 into a symbol value to generate transmission symbol data. The symbol generator 160 outputs the generated transmission symbol data to the transmit filter 170.

The transmit filter 170 executes waveform shaping on the transmission symbol data input from the symbol generator 160. The transmit filter 170 is a filter that sets transmission symbol data in a limited band and that executes waveform shaping to have a predetermined limited band so as to obtain a modulation signal. The transmit filter 170 outputs a modulation signal limited to a predetermined band to the transmit buffer 180.

The transmit buffer 180 temporarily stores therein a modulation signal input from the transmit filter 170 until the transmission timing comes. When the transmission timing comes, the transmit buffer 180 outputs the stored modulation signal to the D/A converter 60.

The frequency control circuitry 190 controls the local oscillator 10. The frequency control circuitry 190 controls, for example, the local oscillator 10 to determine the reception frequency of a signal to be received by the demodulating circuitry 40. The frequency control circuitry 190 controls, for example, the local oscillator 10 to determine the transmission frequency of a signal to be transmitted by modulating circuitry 70. That is, the frequency control circuitry 190 determines the transmission frequency or the reception frequency in the wireless communication apparatus 1.

The antenna-switching control circuitry 200 controls the antenna switch 30. For example, during a reception operation, the antenna-switching control circuitry 200 controls the antenna switch 30 so as to connect the antenna 20 and the demodulating circuitry 40. During a transmission operation, the antenna-switching control circuitry 200 controls the antenna switch 30 so as to connect the antenna 20 and the modulating circuitry 70.

Operation Timing

Figure 2:
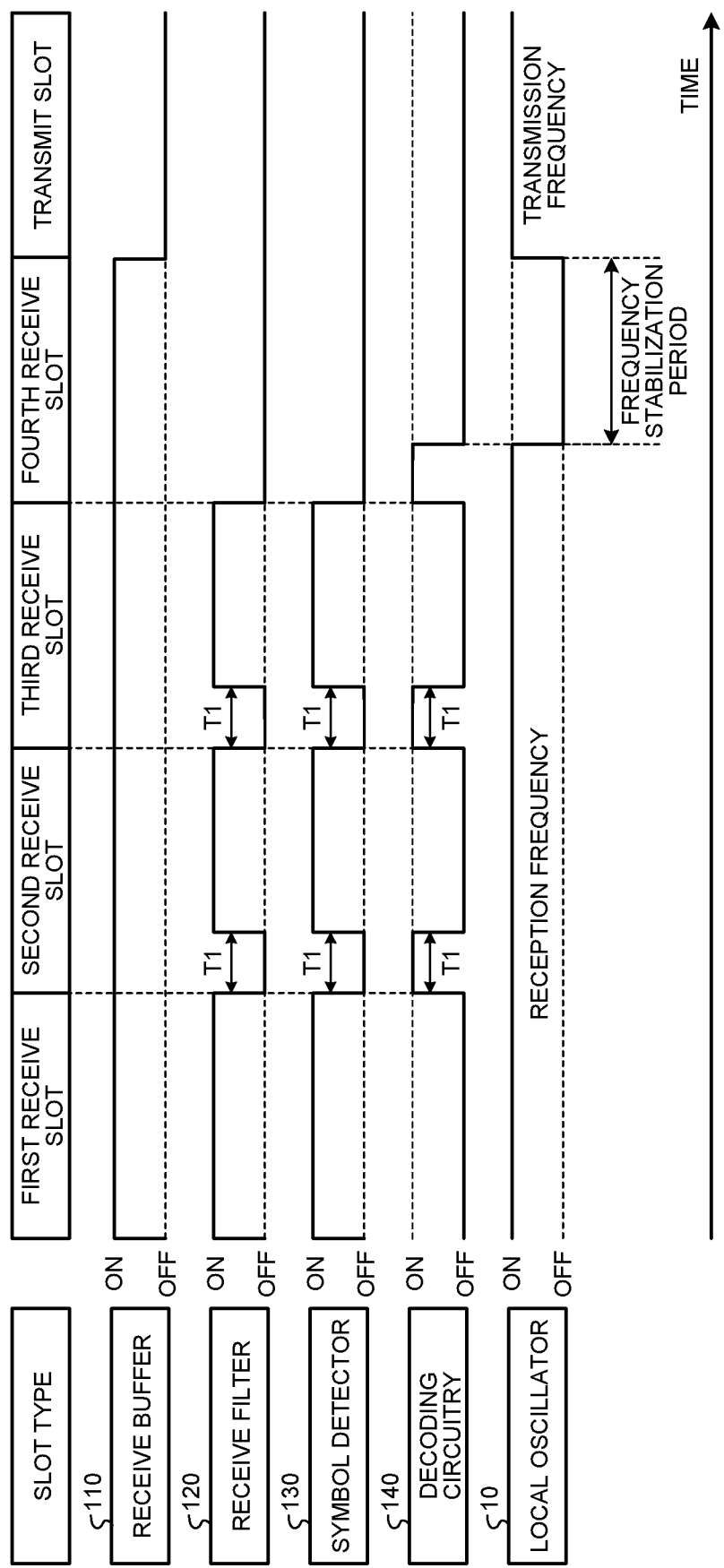
FIG. 2 is a timing chart that illustrates the timings of processes of a receive filter, a symbol detector, and a decoding circuitry.

With reference to FIG. 2, the operation timing of the wireless communication apparatus 1 according to the embodiment is described. FIG. 2 is a timing chart that illustrates the timings of processes of the receive filter 120, the symbol detector 130, and the decoding circuitry 140 in the wireless communication apparatus 1 according to the embodiment. Although referred to as a time slot or a slot below, any style is applicable as long as time is divided into predetermined time periods, the format of data allocated within the divided time period is specified, the receiving and transmitting timings are specified, and it is continuously used for communications. For example a frame is the same in meaning as a time slot or a slot.

In FIG. 2, the slot type represents a type of time slot and includes a receive slot and a transmit slot for digital wireless communications. A first receive slot, a second receive slot, a third receive slot, and a fourth receive slot are time slots each representing a period during which data is received. The transmit slot is a time slot representing a period during which data is transmitted.

FIG. 2 illustrates the operating states of the local oscillator 10, the receive buffer 110, the receive filter 120, the symbol detector 130, and the decoding circuitry 140. The operating state of each part is indicated as "ON" or "OFF". "ON" is an operating state, and "OFF" is a stopped state.

First, the frequency control circuitry 190 controls the local oscillator 10 to set the desired reception frequency for the demodulating circuitry 40. The antenna-switching control circuitry 200 controls the antenna switch 30 to connect the antenna 20 and the demodulating circuitry 40. This enables the wireless communication apparatus 1 to receive an RF signal having the desired frequency.

When the antenna 20 receives an RF signal in the first receive slot, the demodulating circuitry 40 demodulates the RF signal received by the antenna 20 and outputs it to the A/D converter 50. The A/D converter 50 converts the demodulation signal received from the demodulating circuitry 40 into a digital signal and writes it in the receive buffer 110 of the control circuitry 100. Afterward, each time data of a demodulation signal is written in the receive buffer 110, the data is sequentially processed by the receive filter 120 and the symbol detector 130.

In the second receive slot, the decoding circuitry 140 promptly performs a decoding process on the data that has been processed in the first receive slot. Specifically, immediately after the start timing of the second receive slot, the decoding circuitry 140 starts a decoding process on the data from which a symbol has been detected in the first receive slot that is a time slot period previous to the second receive slot in terms of time. At this point, the control circuitry 100 stops the operations of the receive filter 120 and the symbol detector 130 at the same time as it starts the operation of the decoding circuitry 140.

That is, the control circuitry 100 concentrates the resources of the control circuitry 100 on a decoding process of the decoding circuitry 140. Specifically, the control circuitry 100 assigns more resources, such as the percentage of the processing of the CPU of the control circuitry 100 or the allocated data area in the RAM, to a decoding process. Furthermore, the timing in which the control circuitry 100 concentrates the resources on the decoding circuitry 140 is in the early part of the receive slot, i.e., immediately after the start of the receive slot. As illustrated in FIG. 2, during a time period T1, the decoding circuitry 140 is operated, while the receive filter 120 and the symbol detector 130 are stopped. That is, it can be said that no resources of the control circuitry 100 are assigned to the receive filter 120 or the symbol detector 130.

After the elapse of the time period T1, the control circuitry 100 concentrates the resources of the control circuitry 100 on a filtering process of the receive filter 120 and on a reception symbol data generation process of the symbol detector 130. The control circuitry 100 stops the operation of the decoding circuitry 140 and starts the operations of the receive filter 120 and the symbol detector 130. At this point, the receive filter 120 and the symbol detector 130 collectively process the data that is stored, in the receive buffer 110, during the time period T1 in which the receive filter 120 and the symbol detector 130 are stopped. In the third receive slot, the control circuitry 100 performs the same process as that in the second receive slot. Similarly, in the fourth receive slot, the control circuitry 100 starts a decoding process on the data, from which a symbol has been detected in the third receive slot, immediately after the start timing of the fourth receive slot.

In a case where transmission needs to be promptly performed based on a result of a decoding process executed by the decoding circuitry 140 immediately after the start timing of the fourth receive slot, that is, in a case where the decoding result is the control data for the instruction requesting the transmission, the control circuitry 100 starts a transmission preparation process after the decoding process is completed. Furthermore, in a case where transmission needs to be promptly performed as a result of the completion of the decoding process immediately after the start of the fourth receive slot, a filtering process of the receive filter 120 on the data written in the receive buffer 110 and a reception symbol data generation process of the symbol detector 130 are stopped in the fourth receive slot.

Specifically, during the transmission preparation process, the frequency control circuitry 190 of the control circuitry 100 controls the local oscillator 10 to set the desired transmission frequency for the modulating circuitry 70. More specifically, while the reception frequency is set in the local oscillator 10 from the first receive slot until the end of the decoding process in the fourth receive slot, the control circuitry 100 performs switching from the reception frequency to the transmission frequency after the decoding process of the decoding circuitry 140 ends in the fourth receive slot. Furthermore, the control circuitry 100 causes the antenna-switching control circuitry 200 to control the antenna switch 30 so as to connect the antenna 20 and the modulating circuitry 70. This enables the wireless communication apparatus 1 to transmit a signal having the desired frequency.

As illustrated in the fourth receive slot, a certain time period (frequency stabilization time) is needed until the frequency of an output signal of the local oscillator 10 becomes stable at the desired transmission frequency. This is because, for the PLL control, the lock-up time is required to lock the oscillation frequency of the local oscillator 10 at the desired frequency. During the frequency stabilization time, the encoding circuitry 150 performs an encoding process to generate transmission data, the symbol generator 160 executes symbol mapping on the transmission data to generate transmission symbol data, the transmit filter 170 executes band limitation on the transmission symbol data to obtain a modulation signal, and the transmit buffer 180 temporarily stores therein the modulation signal until the timing of the transmit slot comes. As the control circuitry 100 concentrates the resources of the control circuitry 100 on the decoding process immediately after the start of the time slot, a sufficient time for making the frequency of an output signal of the local oscillator 10 stable at the desired transmission frequency may be ensured during the remaining period of the slot in which the decoding has been performed, i.e., before the start of the subsequent time slot. That is, the transmission preparation process represents the process to change from the reception frequency to the transmission frequency and represents a sequence of processes to generate a modulation signal to be transmitted before the transmission frequency of the wireless communication apparatus 1 is fixed.

When the frequency of an output signal of the local oscillator 10 becomes stable at the desired frequency before the timing of the transmit slot, the transmit buffer 180 outputs the stored data to the D/A converter 60. The D/A converter 60 converts the data into an analog signal and outputs it to the modulating circuitry 70. The modulating circuitry 70 executes modulation based on the modulation signal received from the D/A converter 60. The antenna 20 radiates the modulated RF signal into space.

If a result of a decoding process requests the transmission and the subsequent slot is assigned to the transmission preparation process, the transmit slot is delayed by two slots after the acquisition of the transmission request. In contract to this, the wireless communication apparatus 1 according to the present invention concentrates the resources of the control circuitry 100 on a decoding process immediately after the start of a time slot, to thereby promptly obtain a decoding result. Therefore, if the decoding result requests the transmission, the wireless communication apparatus 1 according to the present invention makes effective use of the remaining time period of the slot after the decoding has been performed for the transmission preparation process and allows the start of the transmission in the subsequent slot. That is, it is possible to shorten the transition time to a transmission operation.

Flow of Process of the Wireless Communication Apparatus

Figure 3:
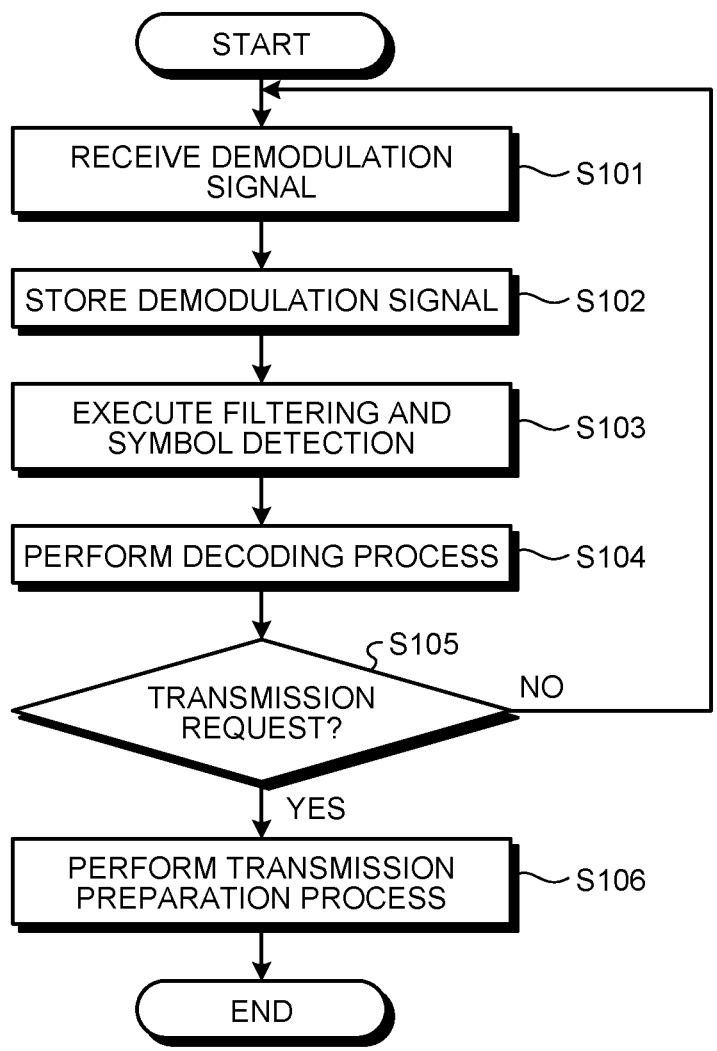
FIG. 3 is a flowchart that illustrates an example of the flow of a process of the wireless communication apparatus according to the embodiment of the present invention.

With reference to FIG. 3, the flow of a process of the wireless communication apparatus 1 according to an embodiment of the present invention is described. FIG. 3 is a flowchart that illustrates an example of the flow of a process of the control circuitry 100 in the wireless communication apparatus 1 according to the embodiment of the present invention.

First, after the antenna 20 receives an RF signal, the control circuitry 100 receives a demodulation signal from the A/D converter 50 (Step S101). Then, the process proceeds to Step S102.

The control circuitry 100 temporarily stores a demodulation signal until it reaches a certain amount (Step S102). Then, the process proceeds to Step S103.

After the received demodulation signal reaches a certain amount, the control circuitry 100 executes filtering and symbol detection on the demodulation signal (Step S103). Then, the process proceeds to Step S104.

The control circuitry 100 performs a decoding process on the reception symbol data from which a symbol has been detected (Step S104). Then, the process proceeds to Step S105.

After the decoding process is performed, the control circuitry 100 determines whether the result of the decoding requests the transmission (Step S105). When it is determined that the transmission is not requested (No at Step S105), the control circuitry 100 proceeds to Step S101 and performs the above-described process. Conversely, when it is determined that the transmission is requested (Yes at Step S105), the process of the control circuitry 100 proceeds to Step S106.

At Step S106, the control circuitry 100 starts a transmission preparation process (Step S106). Then, the control circuitry 100 terminates the process in FIG. 3.

First Modification of Operation Timing

Figure 4:
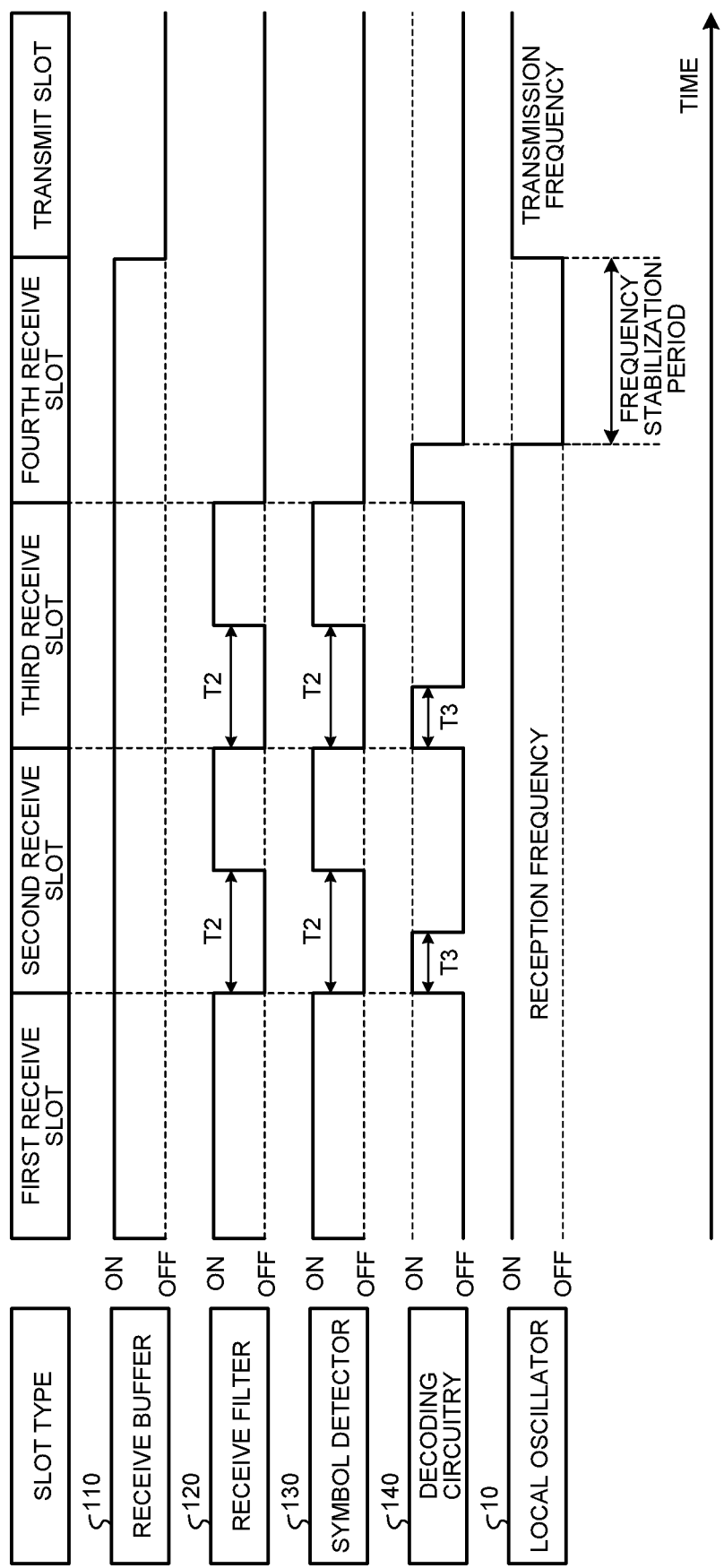
FIG. 4 is a timing chart that illustrates the timings of processes of the receive filter, the symbol detector, and the decoding circuitry.

With reference to FIG. 4, the operation timing of the wireless communication apparatus 1 according to a first modification of the embodiment is described. FIG. 4 is a timing chart that illustrates the timings of the processes of the receive filter 120, the symbol detector 130, and the decoding circuitry 140 in the wireless communication apparatus 1 according to the embodiment.

In the timing chart illustrated in FIG. 2, the control circuitry 100 starts the operation of the decoding circuitry 140 and, at the same time, stops the operations of the receive filter 120 and the symbol detector 130. The control circuitry 100 may stop the receive filter 120 and the symbol detector 130 during a predetermined time period.

As illustrated in FIG. 4, in the second receive slot, the control circuitry 100 operates the decoding circuitry 140 and, at the same time, stops the receive filter 120 and the symbol detector 130 during a predetermined time period T2. As the time period T2 is set to be longer than a time period T3 that is the operation time period of the decoding circuitry 140, the receive filter 120 and the symbol detector 130 are continuously stopped even after the decoding circuitry 140 finishes the decoding process.

Alternatively, the control circuitry 100 may start the processes of the receive filter 120 and the symbol detector 130 after the predetermined time period T2 elapses from the start timing of the receive slot. In this case, too, the time period T2 is set to be longer than the time period T3 that is the operation time period of the decoding circuitry 140. The time period T2 may be optionally set as long as it is a sufficient time period for the decoding circuitry 140 to perform a decoding process. Similarly, the time period T2 may be optionally set as long as it is a sufficient time period for the receive filter 120 and the symbol detector 130 to start processes after the time period T2 and finish them within the receive slot.

The control circuitry 100 performs a process in the third receive slot in the same manner as in the second receive slot. Similarly, in the fourth receive slot, too, the control circuitry 100 starts a decoding process on the reception symbol data, from which a symbol has been detected in the third receive slot, immediately after the start timing of the fourth receive slot.

Second Modification of Operation Timing

Figure 5:
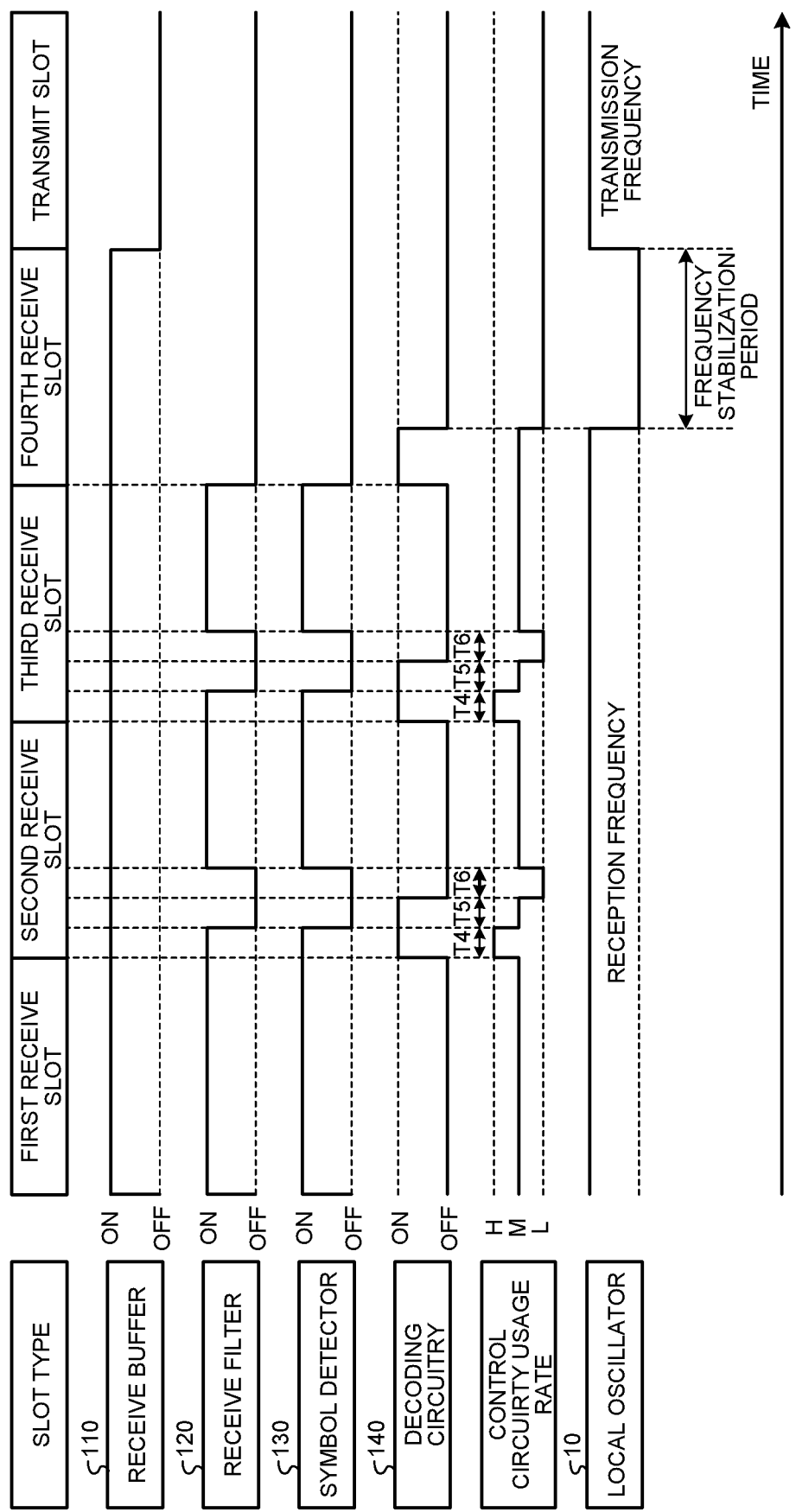
FIG. 5 is a timing chart that illustrates the timings of processes of the receive filter, the symbol detector, and the decoding circuitry.

With reference to FIG. 5, the operation timing of the wireless communication apparatus 1 according to a second modification of the embodiment is described. FIG. 5 is a timing chart that illustrates the timings of processes of the receive filter 120, the symbol detector 130, and the decoding circuitry 140 in the wireless communication apparatus 1 according to the embodiment.

The second modification is the same in that a decoding process is started immediately after the start timing of a slot. That is, as for a process to be performed immediately after the start timing of a slot, priority is given to a decoding process.

The timing chart illustrated in FIG. 5 represents the usage rate of the control circuitry 100 in addition to the operation timings of the local oscillator 10, the receive buffer 110, the receive filter 120, the symbol detector 130, and the decoding circuitry 140.

It can be said that the usage rate of the control circuitry 100 is the degree of processing load of the CPU of the control circuitry 100 as described above and, according to the present embodiment, three types, "H", "M", and "L" are illustrated. "H" means that the usage rate of the control circuitry 100 is high. "M" means that the usage rate of the control circuitry 100 is moderate. "L" means that the usage rate of the control circuitry 100 is low.

As illustrated in FIG. 5, the control circuitry 100 starts the operations of the receive filter 120, the symbol detector 130, and the decoding circuitry 140 immediately after the start timing of the second receive slot. During a time period T4, each of the receive filter 120, the symbol detector 130, and the decoding circuitry 140 is operated and, in this case, the usage rate of the control circuitry 100 is "H".

When the usage rate of the control circuitry 100 becomes "H", the control circuitry 100 gives priority to a decoding process of the decoding circuitry 140 and therefore stops the operations of the receive filter 120 and the symbol detector 130. Thus, during a time period T5, the control circuitry 100 operates the decoding circuitry 140 but stops the operations of the receive filter 120 and the symbol detector 130. In this case, the usage rate of the control circuitry 100 becomes "M". During the time period T5, as the control circuitry 100 stops the operations of the receive filter 120 and the symbol detector 130, the usage rate of the control circuitry 100 is decreased.

Before a time period T6, the decoding process of the decoding circuitry 140 has completed. That is, during the time period T6, the control circuitry 100 stops the operations of the receive filter 120, the symbol detector 130, and the decoding circuitry 140. In this case, the usage rate of the control circuitry 100 is "L". As the receive filter 120, the symbol detector 130, and the decoding circuitry 140 are stopped during the time period T6, the usage rate of the control circuitry 100 is further decreased.

When the decoding process of the decoding circuitry 140 is completed and the usage rate of the control circuitry 100 is "L", the control circuitry 100 resumes the operations of the receive filter 120 and the symbol detector 130. Thus, after the elapse of the time period T6, the usage rate of the control circuitry 100 becomes "M". In the third receive slot, the control circuitry 100 performs the same process as that in the second receive slot. Similarly, in the fourth receive slot, the control circuitry 100 starts a decoding process on the data, from which a symbol has been detected in the third receive slot, immediately after the start timing of the fourth receive slot.

According to the second modification, the control circuitry 100 dynamically controls the resources of the control circuitry 100 based on the usage rate.

As described above, according to the present embodiment, an operation of the decoding circuitry 140 is performed with the resources concentrated thereon immediately after the start timing of a receive slot so that the time of a decoding process is shortened, whereby a sufficient time to perform a transmission preparation process may be ensured and the transition time to a transmission operation may be reduced.

According to the embodiment, the time of a decoding process may be shortened, and the transition time to a transmission operation may be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication apparatus that performs communication for which a receiving timing and a transmitting timing are defined by using time slots, the wireless communication apparatus comprising:
  control circuitry configured to control the wireless communication apparatus, wherein
  the control circuitry comprises decoding circuitry configured to perform a decoding process, on data received in a first time slot, in a second time slot subsequent to the first time slot,
  the control circuitry is configured to concentrate resources of the control circuitry on the decoding process of the decoding circuitry in an early part of the second time slot, and to finish the decoding process before an end of a period of the second time slot, and
  the control circuitry is configured to, in response to determining that a result of the decoding process is information requesting the wireless communication apparatus to perform transmission, perform a transmission preparation process from an end of the decoding process to a start of a third time slot subsequent to the second time slot, within the period of the second time slot for enabling the wireless communication apparatus to perform transmission.

2. The wireless communication apparatus according to claim 1, wherein
  the control circuitry includes a frequency control circuitry configured to determine a transmission frequency and a reception frequency in the wireless communication apparatus, and
  the transmission preparation process includes
    a process performed by the frequency control circuitry to switch from the reception frequency to the transmission frequency, and
    a process to generate, before the transmission frequency in the wireless communication apparatus is fixed, a modulation signal to be transmitted.

3. The wireless communication apparatus according to claim 2, wherein
  the control circuitry includes
    a receive filter configured to filter a demodulation signal received during a period of a time slot and stored in a receive buffer, and
    a symbol detector configured to detect a symbol from a demodulation signal filtered by the receive filter, and
  the control circuitry is configured to cause the receive filter and the symbol detector to operate after the decoding circuitry finishes the decoding process, and
  the control circuitry is configured to, in response to determining that a result of the decoding process is information requesting the wireless communication apparatus to perform transmission, stop operation of the receive filter and the symbol detector in the period of the second time slot.

4. The wireless communication apparatus according to claim 3, wherein after the decoding circuitry finishes the decoding process, the control circuitry starts filtering of the receive filter and symbol detection of the symbol detector at a predetermined time within a period of the second time slot in which the decoding process is performed.

5. A non-transitory computer-readable recording medium containing a computer program for a computer operating as a wireless communication apparatus that performs communication for which a receiving timing and a transmitting timing are defined by using time slots, the program causing the computer to execute:
  performing a decoding process, on data received in a first time slot, in a second time slot subsequent to the first time slot, wherein the performing comprises concentrating resources of the control circuitry on the decoding process of the decoding circuitry in an early part of the second time slot, and finishing the decoding process before an end of a period of the second time slot;

determining whether a result of the decoding process is information requesting the wireless communication apparatus to perform transmission; and in response to determining that the result of the decoding process is information requesting the wireless communication apparatus to perform transmission, performing a transmission preparation process from an end of the decoding process to a start of a third time slot subsequent to the second time slot, within the period of the second time slot for enabling the wireless communication apparatus to perform transmission.

* * * * *